(12) United States Patent
Shooshtari

(10) Patent No.: US 8,357,746 B2
(45) Date of Patent: Jan. 22, 2013

(54) BINDING OF FIBROUS MATERIAL UTILIZING A WATER SOLUBLE MICHAEL ADDUCT CROSSLINKING AGENT AND POLYCARBOXYLIC ACID

(75) Inventor: Kiarash Alavi Shooshtari, Littleton, CO (US)

(73) Assignee: Johns Manville, Denver, CO (US)

( * ) Notice: Subject to any disclaimer, the term of this patent is extended or adjusted under 35 U.S.C. 154(b) by 1281 days.

(21) Appl. No.: 11/799,903

(22) Filed: May 3, 2007

(65) Prior Publication Data

US 2008/0274291 A1 Nov. 6, 2008

(51) Int. Cl.
*C08K 3/40* (2006.01)

(52) U.S. Cl. ........ 524/492; 524/548; 524/549; 524/599; 524/608; 524/847; 526/271; 526/347; 528/271; 528/310; 528/422

(58) Field of Classification Search .................. 524/492, 524/548, 549, 599, 608, 847; 526/271, 347; 528/271, 310, 422
See application file for complete search history.

(56) References Cited

U.S. PATENT DOCUMENTS

| | | | |
|---|---|---|---|
| 5,143,582 A | 9/1992 | Arkens et al. | |
| 5,318,990 A | 6/1994 | Strauss | |
| 5,340,868 A | 8/1994 | Strauss | |
| 5,427,587 A | 6/1995 | Arkens et al. | |
| 5,661,213 A | 8/1997 | Arkens et al. | |
| 6,136,916 A | 10/2000 | Arkens et al. | |
| 6,221,973 B1 | 4/2001 | Arkens et al. | |
| 6,331,350 B1 | 12/2001 | Taylor et al. | |
| 6,699,945 B1 * | 3/2004 | Chen et al. | 525/445 |
| 6,706,853 B1 | 3/2004 | Stanssens et al. | |
| 6,933,349 B2 * | 8/2005 | Chen et al. | 525/329.8 |
| 2005/0014925 A1 * | 1/2005 | Yokota et al. | 528/353 |

FOREIGN PATENT DOCUMENTS

EP 0 583 086 A1 11/1997

OTHER PUBLICATIONS

Formaldehyde-Free Crosslinking Binders for Non-Wovens, Charles T. Arkins et al., Tappi Journal, vol. 78, No. 11, pp. 161-168, Nov. 1995.
PhD dissertation of Kia Alavi entitled Michael Addition of Amines to alpha-beta Unsaturated Esters.

* cited by examiner

*Primary Examiner* — Richard A Huhn
(74) *Attorney, Agent, or Firm* — Robert D. Touslee

(57) ABSTRACT

Improved binder technology for use with fibrous materials is provided whereby the adjoining fibers of a fibrous material are bound in the absence of a phenol-formaldehyde reaction product. A curable binder composition is provided which comprises a water-soluble Michael adduct crosslinking agent having reactive hydroxyl end groups and a polycarboxylic acid capable of undergoing an esterification reaction. The binding composition is coated on a fibrous material and is heated to achieve crosslinking of hydroxyl end groups of the Michael adduct and carboxylic acid groups of the polycarboxylic acid via an esterification reaction to form a cured water-resistant binder in association with the fibrous material wherein adjoining fibers are bound at cross-over points.

9 Claims, No Drawings

BINDING OF FIBROUS MATERIAL UTILIZING A WATER SOLUBLE MICHAEL ADDUCT CROSSLINKING AGENT AND POLYCARBOXYLIC ACID

BACKGROUND OF THE INVENTION

1. Field of the Invention

The subject invention pertains to an improved binding composition for use with fibrous materials. More specifically, the subject invention pertains to the use of a curable binding composition comprising a water-soluble Michael adduct crosslinking agent having reactive hydroxyl end groups and a polycarboxylic acid capable of undergoing an esterification crosslinking reaction. The binding composition is coated on a fibrous material and is heated to achieve crosslinking of the hydroxyl end groups of the Michael adduct crosslinking agent and the carboxylic acid groups of the polycarboxylic acid via an esterification reaction to form a water-resistant cured binder in association with the fibrous material wherein adjoining fibers are bound at cross-over points.

2. Description of the Related Art

Binders for fibrous materials, such as fiberglass, have a variety of uses ranging from stiffening applications where the binder is applied to woven or non-woven fiberglass sheet goods and is cured, producing a stiffer product; thermo-forming applications wherein the binder resin is applied to a sheet or lofty fibrous product, following which it is dried and optionally is B-staged to form an intermediate but yet curable product; and to fully cured systems such as building insulation.

Fibrous glass insulation products generally comprise matted glass fibers bonded together by a cured thermoset polymeric material. Molten streams of glass are drawn into fibers of random lengths and are blown into a forming chamber where they are randomly deposited as a mat onto a traveling conveyor. The fibers, while in transit in the forming chamber and while still hot from the drawing operation, are sprayed with an aqueous binder. A phenol-formaldehyde binder has been used throughout the fibrous glass insulation industry. The residual heat from the glass fibers and the flow of air through the fibrous mat during the forming operation are generally sufficient to volatilize water from the binder, thereby leaving the remaining components of the binder on the fibers as a viscous or semi-viscous high solids liquid. The coated fibrous mat is transferred to a curing oven where heated air, for example, is blown through the mat to cure the binder and rigidly bond the glass fibers together.

Fiberglass binders used in the present sense should not be confused with matrix resins which are an entirely different and non-analogous field of art. While sometimes termed "binders", matrix resins act to fill the entire interstitial space between fibers, resulting in a dense, fiber reinforced product where the matrix must translate the fiber strength properties to the composite, whereas "binder resins" as used herein are not space-filling, but rather coat only the fibers, and particularly the junctions of fibers. Fiberglass binders also cannot be equated with paper or wood product "binders" where the adhesive properties are tailored to the chemical nature of the cellulosic substrates. Many such resins are not suitable for use as fiberglass binders. One skilled in the art of fiberglass binders would not look to cellulosic binders to solve any of the known problems associated with fiberglass binders or binders for use on similar fibrous materials.

Binders useful in fiberglass insulation products generally require a low viscosity in the uncured state, yet possess characteristics so as to form a rigid thermoset polymeric mat for the glass fibers when cured. A low binder viscosity in the uncured state is required to allow the mat to be sized correctly. Also, viscous binders tend to be tacky or sticky and hence they lead to the unwanted accumulation of fiber on the forming chamber walls. This accumulated fiber may later fall onto the mat causing dense areas and product problems. A binder which forms a rigid matrix when cured is required so that a finished fiberglass thermal insulation product or similar product, when compressed for packaging and shipping, will recover somewhat to its as-made vertical dimension when installed in a building.

From among the many thermosetting polymers, numerous candidates for suitable thermosetting fiberglass binder resins exist. However, binder-coated fiberglass products are often of the commodity type, and thus cost becomes a driving factor, generally ruling out in some instances such resins as thermosetting polyurethanes, epoxies, and others. Due to their excellent cost/performance ratio, the resins of choice in the past have been phenol-formaldehyde resins. Phenol-formaldehyde resins can be economically produced, and can be extended with urea prior to use as a binder in many applications. Such urea-extended phenol-formaldehyde binders have been the mainstay of the fiberglass insulation industry for years, for example.

Over the past several decades however, minimization of volatile organic compound emissions (VOCs) both on the part of the industry desiring to provide a cleaner environment, as well as by government regulation, has led to extensive investigations into not only reducing emissions from the current formaldehyde-based binders, but also into candidate replacement binders. For example, subtle changes in the ratios of phenol to formaldehyde in the preparation of the basic phenol-formaldehyde resole resins, changes in catalysts, and addition of different and multiple formaldehyde scavengers, has resulted in considerable improvement in emissions from phenol-formaldehyde binders as compared with the binders previously used. However, with increasingly stringent government regulations, more and more attention has been paid to alternative binder systems which lack formaldehyde.

One such candidate binder system employs polymers of acrylic acid as a first component, and a polyol such as glycerine or a modestly oxyalkylated glycerine as a curing or "crosslinking" component. The preparation and properties of such poly(acrylic acid)-based binders, including information relative to the VOC emissions, and a comparison of binder properties versus urea formaldehyde binders is presented in "Formaldehyde-Free Crosslinking Binders For Non-Wovens", Charles T. Arkins et al., TAPPI JOURNAL, Vol. 78, No. 11, pages 161-168, November 1995. The binders disclosed by the Arkins article, appear to be B-stageable as well as being able to provide physical properties similar to those of urea-formaldehyde resins.

U.S. Pat. No. 5,340,868 discloses fiberglass insulation products cured with a combination of a polycarboxy polymer, a beta-hydroxyalkylamide, and at least one trifunctional monomeric carboxylic acid, such as citric acid. The specific polycarboxy polymers disclosed are poly(acrylic acid) polymers. See also, U.S. Pat. No. 5,143,582

U.S. Pat. No. 5,318,990 discloses a fibrous glass binder which comprises a polycarboxy polymer, a monomeric trihydric alcohol and a catalyst comprising an alkali metal salt of a phosphorous-containing organic acid.

Published European Patent Application EP 0 583 086 A1 appears to provide details of polyacrylic acid binders whose cure is catalyzed by a phosphorus-containing catalyst system as discussed in the Arkins article previously cited. Higher molecular weight poly(acrylic acids) are stated to provide polymers exhibiting a more complete cure. See also U.S. Pat. Nos. 5,661,213; 5,427,587; 6,136,916; and 6,221,973.

Some polycarboxy polymers have been found useful for making fiberglass insulation products. Problems of clumping or sticking of the glass fibers to the inside of the forming chambers during the processing, as well as providing a final product that exhibits the recovery and rigidity necessary to provide a commercially acceptable fiberglass insulation product, have been overcome. See, for example, U.S. Pat. No. 6,331,350. The thermosetting acrylic resins have been found to be more hydrophilic than the traditional phenolic binders, however. This hydrophilicity can result in fiberglass insulation that is more prone to absorb water, thereby possibly compromising the integrity of the product. Also, the thermosetting acrylic resins now being used as binding agents for fiberglass have been found to not react as effectively with silane coupling agents of the type traditionally used by the industry. The addition of silicone as a hydrophobing agent results in problems when abatement devices are used that are based on incineration. Also, the presence of silicone in the manufacturing process can interfere with the adhesion of certain facing substrates to the finished fiberglass material. Overcoming these problems will help to better utilize polycarboxy polymers in fiberglass binders.

U.S. Pat. No. 6,706,853 discloses a reaction product of a cyclic anhydride and an alkanolamine for use when binding fiberglass. Representative cyclic anhydrides include anhydride polymers of maleic anhydride with styrene and with methacrylate monomers.

It is an object of the invention to provide an improved binding composition for use when binding fibrous materials in the absence of the use of a phenol-formaldehyde binder.

It is an object of the invention to provide an improved process for binding a fibrous material to provide a water-resistant cured binder in association with a fibrous material wherein adjoining fibers are bound at cross-over points.

It is a further object of the present invention to provide a bound fibrous material wherein adjoining fibers are bound at cross-over points by means of the cured water-resistant binder of the present invention.

Other objects and advantages of the invention will be apparent to those skilled in the art upon a review of the following description and appended claims.

SUMMARY OF THE INVENTION

An aqueous binding composition for a fibrous material is provided comprising (a) a water-soluble Michael adduct crosslinking agent having reactive hydroxyl end groups formed by the addition reaction of (i) a Michael acceptor compound having alpha-beta unsaturation attached to an electron-withdrawing group, and (ii) a nucleophilic compound serving as a Michael donor capable of reaction with the Michael acceptor, and (b) a polycarboxylic acid having a molecular weight of at least 250 that is capable of undergoing an esterification crosslinking reaction with the water-soluble Michael adduct crosslinking agent when heated.

A process is provided for binding a fibrous material comprising:

(1) applying to a fibrous material as a coating an aqueous binding composition comprising (a) a water-soluble Michael adduct crosslinking agent having reactive hydroxyl end groups formed by the addition reaction of (i) a Michael acceptor compound having alpha-beta unsaturation attached to an electron-withdrawing group, and (ii) a nucleophilic compound serving as a Michael donor capable of reacting with said Michael acceptor, and (b) a polycarboxylic acid having a molecular weight of at least 250 that is capable of undergoing an esterification crosslinking reaction with the water-soluble Michael adduct crosslinking agent when heated, and (2) heating the coated fibrous material to achieve crosslinking of the reactive hydroxyl end groups of the water-soluble Michael adduct crosslinking agent and carboxylic acid groups of the polycarboxylic acid via an esterification reaction to form a water-resistant cured binder in association with the fibrous material wherein adjoining fibers are bound at cross-over points.

A fibrous material is provided that is coated with a water-resistant cured binder formed in accordance with the process of the present invention wherein adjoining fibers are bound at cross-over points. Such bound fibrous material is free of a phenol-formaldehyde resin.

DESCRIPTION OF PREFERRED EMBODIMENTS

An aqueous binding composition is formed comprising (a) a water-soluble Michael adduct crosslinking agent having reactive hydroxyl end groups formed by the addition reaction of (i) a Michael acceptor compound having alpha-beta unsaturation attached to an electron-withdrawing group, and (ii) a nucleophilic compound serving as a Michael donor capable of reaction with the Michael acceptor, and (b) a polycarboxylic acid having a molecular weight of at least 250 that is capable of undergoing an esterification crosslinking reaction with the water-soluble Michael adduct crosslinking agent when heated.

Such Michael acceptors may include at least one vinyl group (i.e., one or more vinyl groups) attached to the electron-withdrawing groups. Representative electron-withdrawing groups include ester groups, acid groups, amide groups, nitro groups, nitrile groups, ketone groups, aldehyde groups, and mixtures of these.

Representative Michael acceptors in the form of alpha-beta unsaturated esters include acrylates, such as ethyl acrylate, propyl acrylate, hydroxy ethyl acrylate, triethylene glycol diacrylate, trimethylolpropane triacrylate, pentaerythrytol tetraacrylate, epoxy acrylates such as bisphenol-A epoxy acrylate, epoxidized oil acrylate, styrene maleic anhydride acrylate, polyester polyol polyacrylates, polyurethane acrylates, metallic acrylates such as zinc diacrylate, polyamide acrylafes, acryloyl propane triethoxy silane, di- and poly (dimethyl silanol)diacrylate, etc.; methacrylates, such as methyl methacrylate, hydroxy ethyl methacrylate, triethylene glycol dimethacrylate, trimethylol propane trimethacrylate, epoxy methacrylates, polyester methacrylates, polyurethane methacrylates, polyamide methacrylates, styrene maleic anhydride methacrylate, etc.; crotonates, such as methyl crotonate, hydroxy ethyl crotonate, epoxy crotonates, urethane crotonates, polyether crotonates, polyester crotonates, etc.; maleates, such as monomethyl maleate, dimethyl maleate, monohydroxy ethyl maleate, dihydroxy ethyl maleate, unsaturated esters containing maleate functionalities, epoxy maleate esters, etc.;

fumarates, such as dimethyl fumarate, monohydroxy ethyl fumarate, dihydroxy ethyl fumarate, unsaturated esters containing fumarate functionalities, epoxy fumarate esters, etc.

Representative Michael acceptors in the form of alpha-beta unsaturated acids include acrylic acid, methacrylic acid, crontic acid, maleic acid, fumaric acid, 2-methyl maleic acid, itaconic acid, 2-methyl itaconic acid, propiolic acid, acetylene dicarboxylic acid, etc.

Representative Michael acceptors in the form of alpha-beta unsaturated amides include acrylamide, methacrylamide, etc.

Representative Michael acceptors in the form of alpha-beta unsaturated nitro compounds include vinyl nitrate, nitro ethylene, nitro acetylene, etc.

Representative Michael acceptors in the form of alpha-beta unsaturated nitrile compounds include acrylonitrile, methacrylonitrile, crotonitrile, etc.

Representative Michael acceptors in the form of alpha-beta unsaturated ketone compounds include methyl vinyl ketone, ethyl vinyl ketone, etc.

Representative Michael acceptors in the form of alpha-beta unsaturated aldehyde compounds include acrolein, methyl acrolein, etc.

The alpha-beta unsaturated Michael acceptor optionally may include additional chemical functionalities such as ether groups, ester groups, epoxy groups, urethane groups, urea groups, aliphatic hydrocarbon groups, aromatic hydrocarbon groups, etc. Michael acceptors in the form of oligomers of glycols and polyols may be utilized.

Maleic anhydride, acrylic anhydride, etc. also can be utilized as the Michael acceptor when forming the Michael adduct crosslinking agent.

The Michael acceptors readily undergo an addition reaction with a nucleophilic compound serving as a Michael donor through covalent bonding to form a water-soluble Michael adduct crosslinking agent having reactive hydroxyl groups. In preferred embodiments the Michael donor utilized to form the water-soluble Michael adduct crosslinking agent is an alkylamine, an alkanolamine, a thiol, and mixtures of these. Representative amines are butyl amine, ethylene diamine, 1,6-hexane diamine, diethylene triamine, amino amides, p-amino phenol, melamine, etc. Preferred amines are mono- or di-alkanolamines having 2 to 4 carbon atoms per alkanol group. Representative mono-alkanolamines include ethanolamine, propanolamine, butanolamine and N-methylethanolamine. Representative di-alkanolamines include diethanol amine, dipropanol amine, disopropyl amine, and dibutanol amine. A particularly preferred amine Michael donor is a dialkanol amine. Representative thiol Michael donors are hydroxy ethyl thiol, hydroxy propyl thiol, etc.

The water-soluble Michael adduct crosslinking agent may be formed by reacting the Michael acceptor and the Michael donor in 1:1 molar proportions with stirring at a temperature of ambient to 95° C. over a period of approximately 10 to 360 minutes. In some embodiments the Michael adduct optionally can be at least partially present as a salt. The resulting Michael adduct in addition to being water-soluble commonly possesses a low viscosity of approximately 5 to 500 cps (preferably approximately 9 to 100 cps) when dissolved in water in a concentration of 50 percent by weight, a low surface tension of approximately 5 to 50 N/m (preferably 10 to 30 N/m) when dissolved in water in a concentration of 10 percent by weight, a low melting point of approximately −50 to 150° C. (preferably −20 to 100° C.), and a low vapor pressure of lower than 1.0 mm Hg.

Such Michael adducts commonly can be formed on a relatively economical basis and readily can be processed and handled by workers.

The resulting water-soluble Michael adduct commonly displays a hydroxy equivalent of approximately 50 to 1000, and preferably approximately 70 to 150 as determined by titration or spectroscopy.

An aqueous coating composition is prepared that includes the water-soluble Michael adduct together with a polycarboxylic acid having a molecular weight of at least 250 that is capable of undergoing an esterification crosslinking reaction with the Michael adduct. The polycarboxylic acid should be provided in the coating composition in a quantity so that the concentration of carboxylic acid groups at least approximates that of the reactive hydroxyl groups provided by the Michael adduct. However, it is possible for the carboxylic acid to be present in an even greater concentration with respect to the Michael adduct up to approximately 5:1 molar ratios.

The polycarboxylic acid that is capable of undergoing an esterification crosslinking reaction with the Michael adduct commonly displays a molecular weight of approximately 1,000 to 500,000, and in preferred embodiments a molecular weight of approximately 2,000 to 10,000 (e.g., approximately 4,000). Such acids of the requisite molecular weight display a plurality of carboxylic acid groups and are well suited to undergo the requisite crosslinking reaction with the Michael adduct.

Any polycarboxylic acid of the requisite molecular weight possessing multiple carboxylic acid groups is suitable for use in accordance with the concept of the present invention. Such polycarboxylic acids preferably are aliphatic in nature. Polyacrylic acid either as a homopolymer or as a copolymer with methacrylic acid, maleic acid, fumaric acid, crotonic acid, etc. can be utilized in a preferred embodiment.

Other representative polycarboxylic acids include polymethacrylic acid, polycrotonic acid, polyfumaric acid, polymaleic acid, poly-2-methyl maleic acid, polyitaconic acid, poly-2-methyl itaconic acid, poly-alpha-beta-methylene glutaric acid, polystyrene maleic acid, polystyrene-co-acrylic acid, polyethylene-co-acrylic acid, polyethylene-co-maleic acid, polybutadiene-co-maleic acid, etc., and copolymers of the foregoing.

In a further preferred embodiment the polycarboxylic acid is a polyamic acid. See in this regard commonly assigned U.S. patent application Ser. No. 11/799,904, filed concurrently herewith, entitled "Binding of Fibrous Material Utilizing a Crosslinked Polyamic Acid" in the names of Kiarash Alavi Shooshtari and Jawed Asrar, the disclosure of which is hereby incorporated by reference.

Optionally, the coating composition prior to crosslinking may include a minor concentration of aliphatic or aromatic lower molecular weight dicarboxylic, tricarboxylic or tetracarboxylic acids, such as adipic acid, maleic acid, terephthalic acid, isophthalic acid, trimellitic acid, pyromellitic acid, butane tetracarboxylic acid, citric acid, ethylenediamine tetraacetic acid, benzophenone tetracarboxylic acid, etc., in a concentration not to exceed approximately 10 percent on a molar basis of the polycarboxylic acid having a molecular weight of at least 250. In this embodiment the presence of such lower molecular weight carboxylic acid serves to lower the viscosity of the solution and to further aid the wetting and coverage of surface of fibrous material.

The aqueous binding composition comprising the water-soluble Michael adduct and the polycarboxylic acid optionally may include further polymeric emulsion components, adhesion promoters, coupling agents, oxygen scavengers, solvents, emulsifiers, pigments, anti-migration aids, UV absorbers, biocides, anti-foaming agents, colorants, dyes, anti-static agents, antioxidants, etc.

When the binding composition is coated on the fibrous material from a water solution, the mass ratio of Michael adduct crosslinking agent to polycarboxylic acid commonly is approximately 1:10 to 10:1, preferably approximately 1:5 to 5:1, and most preferably approximately 1:3 to 3:1.

The fibrous material to which the aqueous binding composition is applied can be provided in various configurations. The plurality of fibrous components of the fibrous material can be continuous or discontinuous. For instance, the fibers can be mineral fibers, organic fibers, or polymeric fibers. Representative polymeric fibers include polyethylene terphthalate fibers which are provided in the form of a spun-bonded mat. In a preferred embodiment the fibrous material comprises glass fibers, and preferably fiberglass fibers that are supplied as long multifilamentary rovings or tows of infinite length. The filament diameters can be adjusted to meet the needs of the requirements of specific end uses. In a preferred embodiment, the fibrous material is fiberglass for the production of building insulation. In other embodiments the fibrous product is a microglass-based substrate useful for a fiberglass printed circuit board, battery separator, filter stock, or reinforcement scrim.

The binder composition product can be applied to the fibrous material as a coating by any technique capable of coating the individual fibrous components thereof. For instance, when the fibrous material is provided in a continuous length, a kiss-roll applicator, curtain coater, deep coating, spray coating, etc. can be utilized.

Once the fibrous material is coated with the aqueous binding composition heat is applied in order to achieve crosslinking of the reactive hydroxyl end groups of the water-soluble Michael adduct crosslinking agent and carboxylic acid groups of the polycarboxylic acid via an esterification reaction to form a water-resistant cured binder in association with the fibrous material wherein adjoining fibers are bound at cross-over points. Such heating commonly is conducted at a temperature of approximately 160 to 250° C., and preferably at a temperature of approximately 200° C. Representative times for such heating commonly are at least 0.5 minutes (e.g., approximately 0.5 to 10 minutes), and preferably approximately 1 to 3 minutes. During such heating the aqueous component of the binding composition is volatized and the individual fibers are securely bound to each other.

The quantity of binder present in the resulting bound product can be adjusted to vary with the needs of specific end uses. At the conclusion of the crosslinking reaction the binder commonly is securely bound on the surfaces of the fibrous material in a concentration of approximately 1 to 50 (e.g., approximately 5 to 10) percent by weight of the fibrous material.

The binder composition of the present invention can be economically prepared and offers advantages over binder compositions that are commonly utilized in the prior art. The use of phenol-formaldehyde component is eliminated. The water-soluble Michael adduct is formed with ease, and possesses the requisite solution viscosity and surface tension for ready application to the fibrous material when dissolved in water. Other advantages with respect to binder compositions include low vapor pressure, low health hazards, the possibility of a neutral pH for the resin solution, elimination of process corrosion, and the potential utilization of renewable raw materials.

The following Examples are presented to provide specific representative embodiments of the present invention. It should be understood, however, that the invention is not limited to the specific details set forth in the Examples. Example Nos. 1 to 6 are directed to the formation of representative water-soluble Michael adduct crosslinking agents, and Example Nos. 7 to 14 exemplify the use of such water-soluble Michael adducts to bind a fibrous material and resulting bound fibrous products. The results achieved when practicing Example Nos. 7 to 14 in accordance with the present invention are compared to those obtained when employing a standard binder resulting from the crosslinking of polyacrylic acid having a molecular weight of approximately 2,000 with triethanolamine under comparable reaction conditions using an acid:hydroxy equivalent ratio of 1:0.75.

EXAMPLE 1

To a stirred reaction zone containing 300 grams of triethylene glycol diacrylate which served as a Michael acceptor were slowly added with stirring 210 grams of diethanolamine which served as a Michael donor with the temperature being maintained below 50° C. The resulting clear viscous product next was dissolved in 510 grams of water and was stirred at 50° C. for two hours during which time the formation of the water-soluble Michael adduct crosslinking agent having reactive hydroxyl groups was completed. The clear aqueous solution following cooling to ambient temperature was found to display a pH of 9.4, a solid content of 50 percent by weight, a hydroxy equivalent of 127.5, and a viscosity of approximately 250 cps.

EXAMPLE 2

To a stirred reaction zone containing 100 grams of trimethylolpropane triacrylate which served as a Michael acceptor were slowly added with stirring 105 grams of diethanolamine which served as a Michael donor with the temperature being maintained below 50° C. The resulting clear viscous product next was dissolved in 205 grams of water and was stirred at 50° C. for two hours during which time the formation of the water-soluble Michael adduct crosslinking agent having reactive hydroxyl groups was completed. The clear aqueous solution following cooling to ambient temperature was found to display a pH of 9.5, a solid content of 50 percent by weight, a hydroxy equivalent of 102.5, and a viscosity of approximately 300 cps.

EXAMPLE 3

To a stirred reaction zone containing 300 grams of triethylene glycol diacrylate which served as a Michael acceptor were slowly added with stirring 61 grams of ethanolamine which served as a Michael donor with the temperature being maintained below 50° C. The resulting clear viscous product next was dissolved in 361 grams of water and was stirred at 50° C. for two hours during which time the formation of the water-soluble Michael adduct crosslinking agent having reactive hydroxyl groups was completed. The clear aqueous solution following cooling to ambient temperature was found to display a pH of 9.4, a solid content of 50 percent by weight, a hydroxy equivalent of 361, and a viscosity of approximately 500 cps.

EXAMPLE 4

A quantity of 210 grams of diethanolamine which served as a Michael donor was dissolved in 282 grams of water and was placed in a reaction zone. Acrylic acid in a quantity of 72 grams which served as a Michael acceptor was slowly added with stirring with the temperature being maintained below 50° C. The temperature was next raised to 90° C. where it was maintained for one hour to complete the formation of a water-soluble Michael adduct crosslinking agent having reactive hydroxyl end groups. The clear aqueous solution following cooling to ambient temperature was found to display a pH of 9.3, a solid content of 50 percent by weight, a hydroxy equivalent of 70.5, and a viscosity of approximately 20 cps.

EXAMPLE 5

A quantity of 315 grams of diethanolamine which served as a Michael donor was dissolved in 431 grams of water. Maleic acid in a quantity of 116 grams which served as a Michael acceptor was slowly added with stirring with the temperature being maintained below 80° C. The temperature was next raised to 90° C. where it was maintained for one hour to complete the formation of a water-soluble Michael adduct crosslinking agent having reactive hydroxyl end groups. The clear aqueous solution following cooling to ambient temperature was found to display a pH of 9.1, a solid content of 50 percent by weight, a hydroxy equivalent of 71.8, and a viscosity of approximately 25 cps.

EXAMPLE 6

A quantity of 315 grams of diethanolamine which served as a Michael donor was dissolved in 413 grams of water. Maleic anhydride in a quantity of 98 grams which served as a Michael acceptor was slowly added with stirring with the temperature being maintained below 80° C. The temperature was next raised to 90° C. where it was maintained for one hour to complete the formation of a water-soluble Michael adduct crosslinking agent having reactive hydroxyl end groups. The clear to slightly amber solution following cooling to ambient temperature was found to display a pH of 9.2, a solid content of 50 percent by weight, a hydroxy equivalent of 68.8, and a viscosity of approximately 35 cps.

EXAMPLE 7

To 20.5 grams of the water-soluble Michael adduct crosslinking agent of Example No. 2 were mixed with 14.4 grams of a 50 percent by weight solution of polyacrylic acid having a molecular weight of approximately 4,000. The acid:hydroxy equivalent ratio was 1:1. The resulting aqueous solution next was coated on fiberglass by means of curtain coating while in a mat configuration, and the coated fiberglass was heated at 200° C. for two minutes to expeditiously achieve the crosslinking of the reactive hydroxyl end groups of the water-soluble Michael adduct crosslinking agent and carboxylic acid groups of the polyacrylic acid via an esterification reaction to form a water-resistant cured binder in association with the fiberglass wherein adjoining fibers are bound at cross-over points.

The resulting crosslinked binder was present on the fiberglass in a concentration of 5 to 10 percent. When compared to the standard binder, the solution viscosity prior to crosslinking was lower resulting in the increased wetting of the fiberglass, the moisture resistance of the crosslinked fiberglass was superior, and the modulus of the resulting crosslinked product was approximately 30 percent higher.

EXAMPLE 8

Example No. 7 was repeated with the exception that 14.1 grams of the water-soluble Michael adduct crosslinking agent of Example No. 4 were utilized. When compared to the standard binder, the solution viscosity prior to crosslinking was lower resulting in the increased wetting of the fiberglass, the moisture resistance of the cross-linked fiberglass was superior, and the modulus of the resulting crosslinked product was approximately 20 percent higher.

EXAMPLE 9

Example No. 7 was repeated with the exception that 14.36 grams of the water-soluble Michael adduct crosslinking agent of Example No. 5 were utilized. When compared to the standard binder, the solution viscosity prior to crosslinking was lower resulting in the increased wetting of the fiberglass, the moisture resistance of the crosslinked fiberglass was superior, and the modulus of the resulting crosslinked product was approximately 15 percent higher.

EXAMPLE 10

Example No. 7 was repeated with the exception that 13.76 grams of the water-soluble Michael adduct crosslinking agent of Example No. 6 were utilized. When compared to the standard binder, the solution viscosity prior to crosslinking was lower resulting in the increased wetting of the fiberglass, the moisture resistance of the crosslinked fiberglass was superior, and the modulus of the resulting crosslinked product was approximately 20 percent higher.

EXAMPLE 11

To 20.5 grams of the water-soluble Michael adduct crosslinking agent of Example No. 2 were added 33.2 grams of a 50 percent by weight solution of polyamic acid having a molecular weight of approximately 4,000. Such polyamic acid was formed by the reaction of styrene maleic anhydride having a molecular weight of approximately 4,000 with ammonia in a molar ratio of 1:1 in accordance with the teachings of U.S. patent application Ser. No. 11/799,904, filed concurrently herewith, entitled "Binding of Fibrous Material Utilizing a Crosslinked Polyamic Acid" in the names of Kiarash Alavi Shooshtari and Jawed Asrar, the disclosure of which is incorporated by reference. The acid:hydroxy equivalent ratio was 1:1. The resulting aqueous solution was coated on fiberglass by means of curtain coating while in a mat configuration and crosslinking was achieved as desired in conjunction with Example No. 7. In addition to the esterification reaction the amide groups of the polyamic acid formed polyimide groups upon heating with the resulting water-resistant cured binder in association with the fiberglass wherein adjoining fibers are bound at cross-over points. When compared to the standard binder, the solution viscosity prior to crosslinking was lower resulting in the increased wetting of the fiberglass, the moisture resistance of the crosslinked fiberglass was superior, and the modulus of the resulting crosslinked product was approximately 40 percent higher.

EXAMPLE 12

Example No. 11 was repeated while utilizing 14.1 grams of the water-soluble Michael adduct crosslinking agent of Example No. 4. When compared to the standard binder, the solution viscosity prior to crosslinking was lower resulting in the increased wetting of the fiberglass, the moisture resistance of the crosslinked fiberglass was superior, and the modulus of the resulting crosslinked product was approximately 20 percent higher.

EXAMPLE 13

Example No. 11 was repeated while utilizing 14.36 grams of the water-soluble Michael adduct crosslinking agent of Example No. 5. When compared to the standard binder, the solution viscosity prior to crosslinking was lower resulting in the increased wetting of the fiberglass, the moisture resistance of the crosslinked fiberglass was superior, and the modulus of the resulting crosslinked product was approximately 20 percent higher.

EXAMPLE 14

Example No. 11 was repeated while utilizing 13.76 grams of the water-soluble Michael adduct crosslinking agent of Example No. 6. When compared to the standard binder, the solution viscosity prior to crosslinking was lower resulting in the increased wetting of the fiberglass, the moisture resistance of the crosslinked fiberglass was superior, and the modulus of the resulting crosslinked product was approximately 20 percent higher.

Additionally, the products of Example Nos. 7 to 14 in accordance with the present invention displayed similarly improved results when compared to bound fibrous products utilizing binders that were formed by (a) the reaction of poly (styrene-maleic) anhydride having a molecular weight of approximately 4,000 and diethanolamine in molar ratios of 1:1 and 1:1.3, and (b) the reaction of poly (styrene-maleic) anhydride having a molecular weight of approximately 4,000 and triethanolamine in molar ratios of 1:0.66 and 1:1.

The principles, preferred embodiments, and modes of operation of the present invention have been described in the foregoing specification. The invention which is protected herein, however, is not to be construed as being limited to the particular forms disclosed, since these are to be regarded as being illustrative rather than restrictive. Variations and changes may be made by those skilled in the art without departing from the spirit of the invention.

The invention claimed is:

1. An aqueous binding composition for a fibrous material comprising (a) a water-soluble Michael adduct crosslinking agent having reactive hydroxyl end groups formed by the addition reaction of (i) a Michael acceptor compound having alpha-beta unsaturation attached to an electron-withdrawing group, and (ii) a nucleophilic compound serving as a Michael donor capable of reaction with said Michael acceptor, and (b) a polyamic acid having a molecular weight of at least 250 that is capable of undergoing an esterification crosslinking reaction with said water-soluble Michael adduct crosslinking agent when heated.

2. The aqueous binding composition for a fibrous material according to claim 1, wherein the electron withdrawing group of said Michael acceptor compound is selected from ester groups, acid groups, amide groups, nitro groups, nitrile groups, ketone groups, aldehyde groups, and mixtures thereof.

3. The aqueous binding composition for a fibrous material according to claim 1, wherein said Michael acceptor compound is provided at least in part by an acrylate, maleate, or fumarate compound.

4. The aqueous binding composition for a fibrous material wherein said nucleophilic compound serving as a Michael donor is selected from the group consisting of alkylamines, alkanolamines, thiols, and mixtures of these.

5. The aqueous binding composition for a fibrous material according to claim 1, wherein said nucleophilic compound serving as a Michael donor is a mono- or dialkanol amine having 2 to 4 carbon atoms per alkanol group.

6. The aqueous binding composition for a fibrous material according to claim 1, wherein said nucleophilic compound serving as a Michael donor is diethanolamine.

7. The aqueous binding composition for a fibrous material according to claim 1, wherein said polyamic acid possesses a molecular weight of approximately 1,000 to 500,000.

8. The aqueous binding composition for a fibrous material according to claim 1, wherein said polyamic acid possesses a molecular weight of approximately 2,000 to 10,000.

9. The aqueous binding composition for a fibrous material according to claim 1, wherein said Michael acceptor compound is selected from the group consisting of acrylic acid, maleic acid, fumaric acid, maleic anhydride, and mixtures thereof; and said nucleophilic compound serving as a Michael donor is diethanolamine.

\* \* \* \* \*